United States Patent [19]

Schouhamer Immink et al.

[11] Patent Number: 4,660,097
[45] Date of Patent: Apr. 21, 1987

[54] COLOR VIDEO SYSTEM WITH DIGITAL AUDIO PULSE WIDTH MODULATION

[75] Inventors: Kornelis A. Schouhamer Immink; Ronaldus M. Aarts; Josephus A. H. M. Kahlman, all of Eindhoven, Netherlands

[73] Assignee: U.S. Philips Corporation, New York, N.Y.

[21] Appl. No.: 804,241

[22] Filed: Dec. 2, 1985

Related U.S. Application Data

[63] Continuation of Ser. No. 488,573, Apr. 25, 1983, abandoned.

[30] Foreign Application Priority Data

Feb. 14, 1983 [NL] Netherlands ............... 8300541

[51] Int. Cl.[4] .................. A04N 5/92; A04N 9/80
[52] U.S. Cl. ........................ 358/310; 358/330; 358/328; 358/343; 360/19.1; 360/32
[58] Field of Search ............... 358/310, 330, 342, 343, 358/12, 13, 335, 142, 143, 328; 360/19.1, 32, 33.1; 375/22

[56] References Cited

U.S. PATENT DOCUMENTS

| | | | |
|---|---|---|---|
| 4,022,986 | 5/1977 | Teer | 360/32 |
| 4,068,259 | 1/1978 | Tinet | 358/310 |
| 4,223,282 | 9/1980 | Boer | 455/44 |
| 4,447,834 | 5/1984 | Sugiyama | 358/310 |
| 4,480,270 | 10/1984 | Wilkinson | 358/343 |

OTHER PUBLICATIONS

"Philips Technical Review", vol. 40, 1982, No. 6, pp. 149–180 publ. 9/10/82.
"System Coding Parameters, Mechanics and Electro-Mechanics of the Reflective Video Disc Player" by Bogels, IEEE Trans. on Cons. Elec., vol. CE-22, No. 4, pp. 309–317, Nov. 1976.

*Primary Examiner*—Alan Faber
*Attorney, Agent, or Firm*—Thomas A. Briody; Jack Oisher; William J. Streeter

[57] ABSTRACT

A method of encoding a recording signal which includes a composite color video signal and a digital audio signal, for recording the same on and reading it from an optical video disc is disclosed. The color video signal is frequency-modulated on a carrier wave in the customary manner, while the audio signal pulse-width modulates the carrier wave.

33 Claims, 8 Drawing Figures

COLOR VIDEO SYSTEM WITH DIGITAL AUDIO PULSE WIDTH MODULATION

This is a continuation of application Ser. No. 488,573, filed Apr. 25, 1983 now abandoned.

BACKGROUND OF THE INVENTION

The invention relates to a method of encoding a recording signal comprising a composite color video signal, and a further signal in a transmission system for recording and reproducing said recording signal on a record carrier, in particular an optically readable disc-shaped record carrier, a carrier wave signal of a frequency in the range of 6.5–9.5 MHz being frequency-modulated by the composite color video signal.

The invention also relates to a record carrier provided with a recording signal encoded in accordance with the method, an apparatus for carrying out the method and an apparatus for reproducing a signal encoded in accordance with the method.

Such a method, record carrier and apparatus are inter alia known from the article "System coding parameters, mechanics and electro-mechanics of the reflective video disc player" by P. W. Bögels, published in "IEEE Transactions on Consumer Electronics", November 1976, pages 309–317, which publication is herewith incorporated by reference. Taking into account possible cross-talk of audio information into video information, possible cross-talk of, in particular, lower side bands of the modulated video information into the audio information, and disturbing effects as a result of cross-modulation products, it is possible to accommodate the audio information in the form of the two carrier waves modulated with the audio information, which carrier waves have frequencies which have been selected carefully in relation to the video carrier frequencies. For NTSC, carrier waves of 2.3 MHz and 2.8 MHz have been selected and in relation to a video carrier wave of 8 MHz (frequency at black level).

SUMMARY OF THE INVENTION

The known method, record carrier and apparatus provide an excellent video reproduction quality and an acceptable audio reproduction quality. It is the object of the invention to provide a method of the type mentioned in the opening paragraph, a record carrier provided with a recording signal encoded in accordance with the method, an apparatus for carrying out the method, and an apparatus for reproducing a signal encoded in accordance with the method, by means of which an improved audio reproduction quality is obtained. To this end the method in accordance with the invention is characterized in that the further signal is a digital signal comprising a bit stream of data bits which can each assume a limited number of discrete values, which digital signal occupies a frequency band below the first-order lower side-band of the frequency-modulated carrier signal and said frequency-modulated carrier signal is pulse-width modulated by the digital signal. The further signal may be a digital audio signal or another signal coded in that digital audio signal format, such as computer-data signals or time-compressed audio signals.

The invention is based on the insight that, although in said article the addition of FM-modulated carrier waves of comparatively narrow bandwidth is depicted as a problem, it is possible to accommodate the digital audio signal of comparatively large bandwidth because:

the digital audio signal can be accommodated in the frequency band below the necessarily present first-order lower side-band of the modulated video carrier wave, so that cross-talk of the audio signal to the video signal can be limited, the second order lower side-band and possibly a higher-order lower side-band of the modulated video carrier wave, which cannot be filtered out in advance because it is inter alia caused by the pulse-width modulation and is situated within the frequency spectrum of the digital audio signal, need not be disturbing because a digital signal is more immune to disturbances by analog signals of comparatively low amplitude, the intermodulation components need not be disturbing because the relative amplitude of the digital signals may be comparatively small because a substantially smaller signal-to-noise ratio is permissible with digital signals than with analog signals.

The method in accordance with the invention may further be characterized in that the further signal comprises a series of digitally coded samples of an analog audio signal with a sampling frequency of 44.1 kHz, which is subjected to EFM-modulation prior to recording. This method is advantageous because EFM-modulation is particularly immune to disturbances and the modulation thus defined is the modulation used in "Compact-disc-digital-audio" players—which are made by varous manufacturers—so that a combined audio-video player can be constructed in a simple manner and the commercially available integrated circuits for EFM-modulation can be utilized in a player for reproducing a recording signal encoded in accordance with this method. For a definition of EFM-modulation reference is made to "Philips Technical Review", Vol. 40, 1982, no. 6, the entire issue but in particular pages 157–164, which entire issue is herewith incorporated by reference.

A further characteristic feature of the method in accordance with the invention is that prior to recording, the digital signal is passed through a low-pass filter with a cut-off frequency in the range from 1.5 to 2 MHz. This reduces possible cross-talk of the digital audio signal to the video signal. This bandwidth reduction is found to have no adverse effect on the audio reproduction quality.

In order to minimize cross-talk and intermodulation effects, it is advantageous in a method in accordance with the invention that prior to recording, the digital signal is passed through a low-frequency pre-emphasis filter in which signals of a frequency below a cut-off frequency are emphasized relative to signals of a frequency above said cut-off frequency and, after read-out, are passed through a filter which is complementary thereto. This step is based on the recognition that for low frequencies, more interference occurs than for high frequencies owing to the use of, in particular, a helium-neon laser. This pre-emphasis enables a maximum reduction of the digital signal.

As regards the cut-off frequency, this method may further be characterized in that the cut-off frequency of the low-pass filter is situated in the range from 100 kHz to 1 MHz. This cut-off frequency then corresponds to the frequency where the spectrum of the EFM-modulation has a maximum.

For the reproduction of EFM-coded signals, stringent requirements are imposed on the accuracy of the necessary clock signals. The same applies to the horizontal line synchronizing signals of the video signal, which control the speed of the turntable and thus influence the frequency of the audio signal being reproduced. Therefore, it is advantageous in a method in accordance with the invention that during reproduction of the recorded signal, a first reference frequency, which is related to said sampling frequency of 44.1 kHz, is generated for the decoding of the digital audio signal, that a second reference frequency for the processing of the composite color video signal, which second reference frequency is related to the horizontal synchronizing frequency of said video signal, is generated and that said first and second reference frequencies are both derived from a third reference frequency. In this way it can be achieved that the second reference frequency is sufficiently accurate and is related to the first reference frequency in a sufficiently accurate manner.

In order to meet the stringent accuracy requirements and to enable a simple generation of the first and second reference frequencies, a further characteristic feature of the method in accordance with the invention is that the composite color video signal is a PAL-colour video signal, that the first and the second reference frequencies are derived from the third reference frequency of $n \times 4.234375$ MHz ($n = 1, 2, 3, 4, \ldots$), the second reference frequency being derived from the third reference frequency by dividing said third reference frequency by $n \times 271$.

For the same reasons, but now for use with the NTSC standard instead of the PAL-standard, this method may further be characterized in that the composite color video signal is an NTSC color video signal, and the first and the second reference frequencies are derived from a third reference frequency of $n \times 4.232518$ MHz ($n = 1, 2, 3, 4, \ldots$), the second reference frequency being derived from said third reference frequency by dividing said third reference frequency by $n \times 269$.

The invention is also embodied in a record carrier provided with a recording signal encoded in conformity with the method in accordance with the invention. This record carrier is characterized by a track pattern of optically detectable areas, which alternate with intermediate areas, which areas have a mutual spacing in the track direction which is modulated in conformity with the instantaneous period of the frequency-modulated composite color video signal and a length relative to the adjacent intermediate areas which can assume substantially at least two distinct discrete values, the digital signal being encoded in the sequence of said distinct values.

The invention is also embodied in an apparatus for carrying out the inventive method. This apparatus is characterized in that it comprises an FM-modulator for modulating a composite color video signal on a carrier wave of a frequency in the range from 6.5-8.5 MHz and a pulse-width modulator for the pulse-width modulation of said frequency-modulated carrier signal by a digital signal comprising a bit stream of data bits which can each assume a limited number of discrete values, which digital signal occupies a frequency band below the first-order side-band of the frequency-modulated carrier signal.

A preferred embodiment of this apparatus may further be characterized in that the pulse-width modulator is preceded by an EFM-modulator.

In order to limit the bandwidth of the digital signal, this preferred embodiment is further characterized in that a low-pass filter with a cut-off frequency in the range from 1.5 to 2 MHz is arranged between the EFM-modulator and the pulse-width modulator.

This apparatus in accordance with the invention may further be characterized in that the pulse-width modulator is preceded by a low-frequency pre-emphasis filter in which signals of a frequency lower than a cut-off frequency are emphasized relative to signals of a frequency higher than said cut-off frequency. In this respect, it is advantageous that the cut-off frequency of the low-frequency pre-emphasis filter is situated in the range from 100 kHz to 1 MHz.

The apparatus in accordance with the invention may also be characterized in that there are provided means for reducing the second-order lower side-band component of the modulated composite color video signal. In this way the influence of this component is reduced by the use of a technique known per se, which is described in inter alia U.S. Pat. No. 4,223,282 which Patent Specification is incorporated herewith by reference.

The invention is also embodied in an apparatus for reproducing a signal encoded by the method in accordance with the invention and is characterized in that it comprises an FM-demodulator for recovering the composite color video signal and a pulse-width demodulator for recovering the digital signal.

A preferred embodiment of this apparatus in accordance with the invention may be characterized in that the pulse-width demodulator is followed by an EFM-demodulator.

This apparatus may further be characterized in that the pulse-width demodulator is followed by a high frequency pre-emphasis filter in which signals of a frequency above a cut-off frequency are emphasized relative to signals of a frequency below said cut-off frequency.

As regards said cut-off frequency, this embodiment may further be characterized in that the cut-off frequency of the high-frequency pre-emphasis filter is situated in the range from 100 KHz to 1 MHz.

As regards the generation of reference frequencies, this apparatus may further be characterized by a first circuit for supplying a first reference frequency which is related to a sampling frequency of 44.1 kHz for decoding the digital signal produced by sampling an analogue signal with a frequency of 44.1 kHz, a second circuit for supplying a second reference frequency which is related to the horizontal synchronizing frequency of said video signal, and a frequency generator which supplies a third reference frequency to which the first and second reference frequencies are locked.

For the reproduction of PAL-signals, this apparatus may further be characterized in that the frequency generator is tuned to a frequency of $n \times 4.234375$ MHz ($n = 1, 2, 3, 4 \ldots$) and the second circuit produces the second reference frequency by dividing the third reference frequency by $n \times 271$.

For the reproduction of NTSC-signals, this apparatus may further be characterized in that the frequency generator is tuned to a frequency of $n \times 4.232518$ MHz ($n = 1, 2, 3, 4, \ldots$) and the second circuit produces the second reference frequency by dividing the third reference frequency by $n \times 269$.

DESCRIPTION OF THE DRAWINGS

The invention will now be described in more detail, by way of example, with reference to the drawings, in which.

DESCRIPTION OF THE PREFERRED EMBODIMENT

Figure 1:
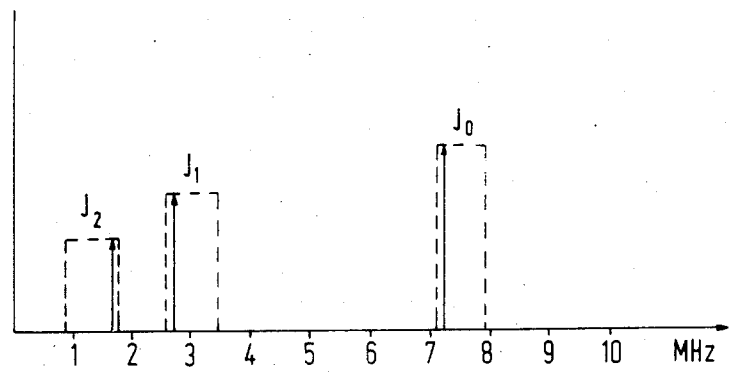
FIG. 1 schematically shows the principal components of the spectrum of the frequency-modulated carrier signal for a video signal in conformity with the PAL-standard.

FIG. 1 shows the spectrum of a PAL video signal which is frequency-modulated on a carrier wave of 7.1 MHz (frequency in the case of modulation by the black level of the video signal), where $J_0$ is the principal component representing the frequency as a function of the amplitude of the video signal, $J_1$ is the first-order lower side-band, also referred to as chroma band, which is situated at 4.43 MHz from the principal component $J_0$, 4.43 MHz being the frequency of the chrominance carrier in the video signal, and $J_2$ is the second-order sideband which is mirror-inverted relative to the frequency zero-point. In the known apparatus, two FM-modulated audio carrier waves of 0.683 and 1.066 MHz are added to this signal.

Figure 2:
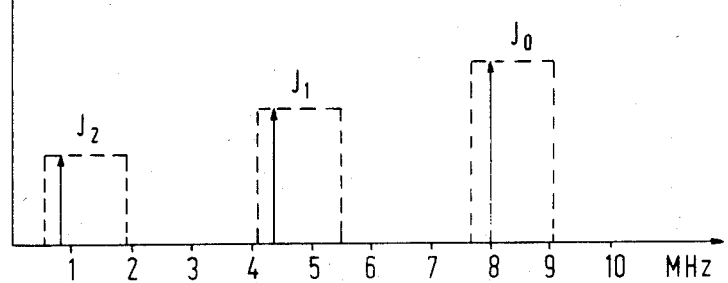
FIG. 2 schematically shows the principal components of the spectrum of the frequency-modulated carrier signal for a video signal in conformity with the NTSC-standard.

FIG. 2 shows the spectrum of an NTSC-video signal which is frequency-modulated on an 8-MHz carrier wave (frequency in the case of modulation by the black level of the video signal). Since in an NTSC-signal the chrominance carrier wave has a frequency of 3.58 MHz, the lower sidebands $J_1$ and $J_2$ are now spaced at distances of 3.58 and 7.16 MHz, respectively. In the known apparatus and audio signals are added as FM-carrier waves at 2.3 and 2.8 MHz.

Figure 3:
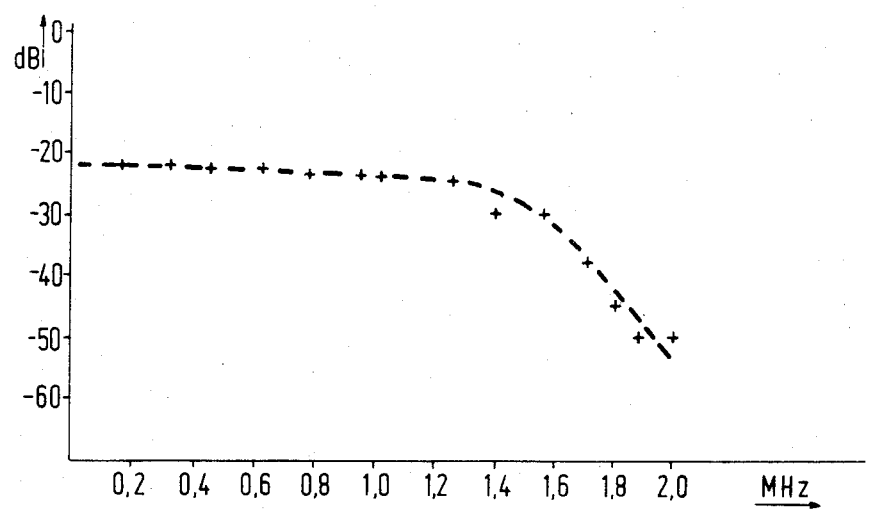
FIG. 3 is a graph indicating the relative level of a pulse-width modulation of the frequency-modulated carrier signal, for which level visible interference occurs in the reproduced video picture, as a function of the frequency.

FIG. 3 shows the results of a measurement of the effect of a pulse-width modulation of the carrier wave which is frequency-modulated by the video signal (in the present case PAL), on the picture quality. The relative amplitude is ploted of the signals with which said carrier wave is pulse-width modulated, the influence on the picture being shown as a function of the frequency. The graph shows that the influence remains fairly constant up to approximately 1.5 MHz and increases above this frequency. The graph illustrates that with a maximum signal level, pulse-width modulation may be applied when the signal is passed through a low-pass filter with a cut-off frequency in the range from 1.5 to 2 MHz.

In optical recording, the signal-to-noise ratio at low frequencies deteriorates as a result of the interference produced by the He-Ne laser. Since for the coding in according with the invention a comparatively weak signal strength of the digital audio signal is desirable, it is advantageous to emphasize the signal strength at low frequencies relative to the signal strength at higher frequencies. A suitable cut-off frequency is situated in the range from 100 kHz–1 MHz, in particular at 500 kHz, because at 500 kHz the EFM-spectrum exhibits a maximum and rolls off below this frequency.

Figure 4:
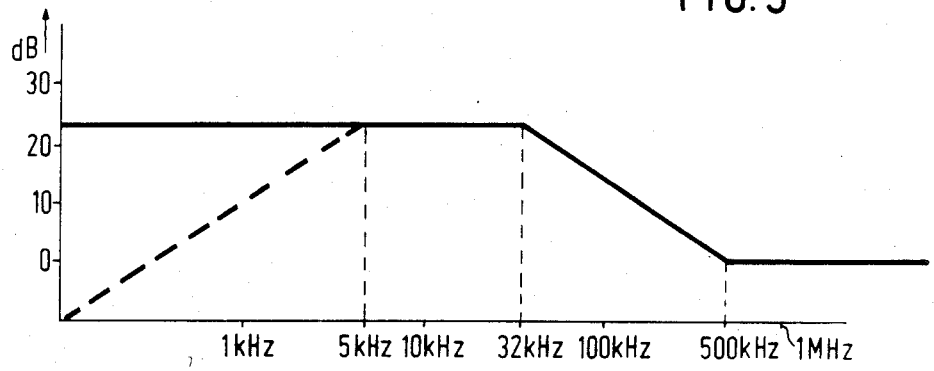
FIG. 4 shows the frequency diagram of the low-frequency pre-emphasis filter.

FIG. 4 shows the frequency diagram of a suitable low-frequency pre-emphasis filter. The cut-off frequency is situated at 500 kHz. Below this frequency the signal strength is boosted by 5 dB/octave, which is easy to achieve. The cross-over frequency at which the characteristic becomes flat again (in the present example at approximately 32 kHz), is determined by the pre-emphasis level for low frequencies, which level is dictated by the visibility limit (FIG. 3) and its possible influence on control systems, such as the radial tracking. In the present example, the pre-emphasis is approximately 23 dB.

Figure 5:
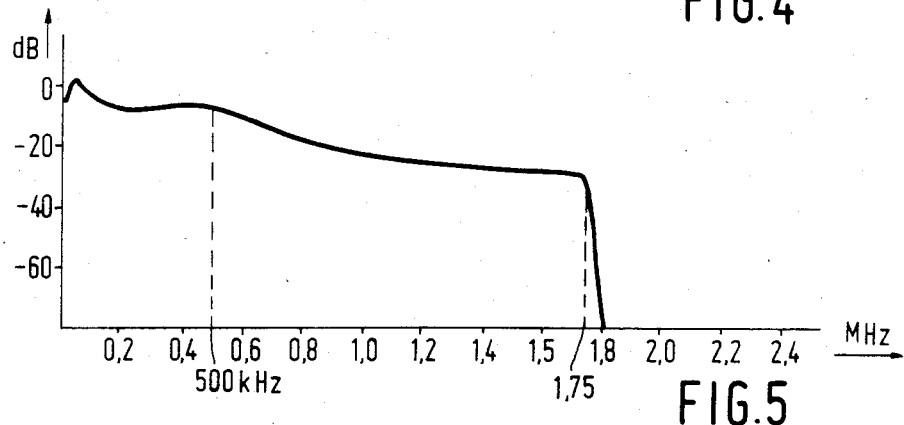
FIG. 5 shows the spectrum of the EFM-modulated digital signal after the passage through the low-pass filter and the low-frequency pre-emphasis filter.

FIG. 5 shows the resulting EFM-spectrum after low-pass filtering with a cut-off frequency of 1.75 MHz and after the passage through a low-frequency pre-emphasis filter having a characteristic as shown in FIG. 4. This spectrum increases gradually with approximately 23 dB to 500 kHz, after which the low-frequency pre-emphasis filter ensures that the spectrum remains substantially constant down to very low frequencies. The spectrum thus obtained can be accommodated in the frequency band below the $J_1$ component (FIGS. 1 and 2) without any significant problems, while in the case of an NTSC-signal, the two audio FM-carriers can be maintained, so that it is possible to manufacture a record carrier with both digital audio and FM-audio, which can read on both types of players.

A broken line in FIG. 4 denotes a roll-off for frequencies lower than, for example 5 kHz, which may be useful in order to preclude a disturbance of the various low-frequency control systems.

Figure 6:
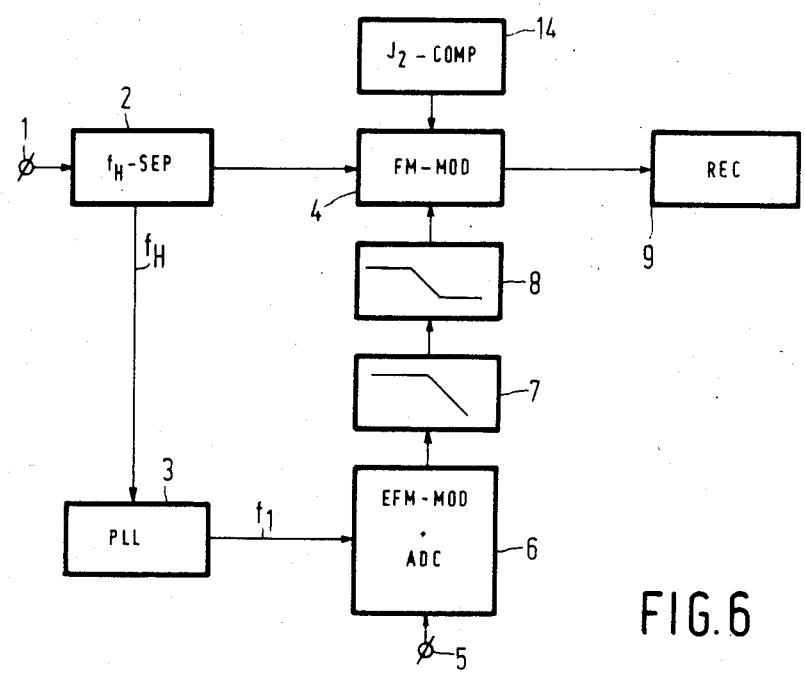
FIG. 6 shows an embodiment of an apparatus for encoding a recording signal in accordance with the invention.

FIG. 6 shows an apparatus for encoding a recording signal in accordance with the invention. It comprises an input 1 for receiving a composite video signal. By means of a sync-separator 2, a signal of a frequency ($f_h$) equal to the frequency for the horizontal synchronizing signals in the composite video signal, is extracted, which is applied to a frequency generator 3 which comprises, for example, a phase-locked loop. This frequency generator 3 supplies a signal of a frequency $f_1$ for the processing of the digital audio signal; in the present example, a signal of a frequency of 4.2336 MHz (=96×44.1 kHz; 44.1 kHz being the sampling frequency of the analog audio signal). Further, the composite video signal is applied to an FM-demodulator 4, for example an oscillator which is voltage-controlled by the video signal. Subsequently, the FM-signal is applied to a device 9 which in a manner known per se records this FM-signal on a record carrier, in particular a video disc, by means of a laser.

The analog audio signal is applied to the signal processing unit 6, which inter alia comprises an analog-to-digital converter and an EFM-modulator, which may be of a type as described in the article in "Philips Technical Review" mentioned in the introduction. This processing unit receives the signal of the frequency $f_1 = 4.2336$ MHz from the generator 3 for synchronizing the signal processing. The EFM-modulated signal is subsequently passed through a low-pass filter 7 with a cut-off frequency of 1.75 MHz and a low-frequency pre-emphasis filter 8 with a characteristic as shown in FIG. 4 and is then applied to a pulse-width control input of the FM-modulator 4. In its simplest form, this pulse-width control is obtained by addition prior to limiting, which will be explained with reference to FIG. 8.

Figure 8:
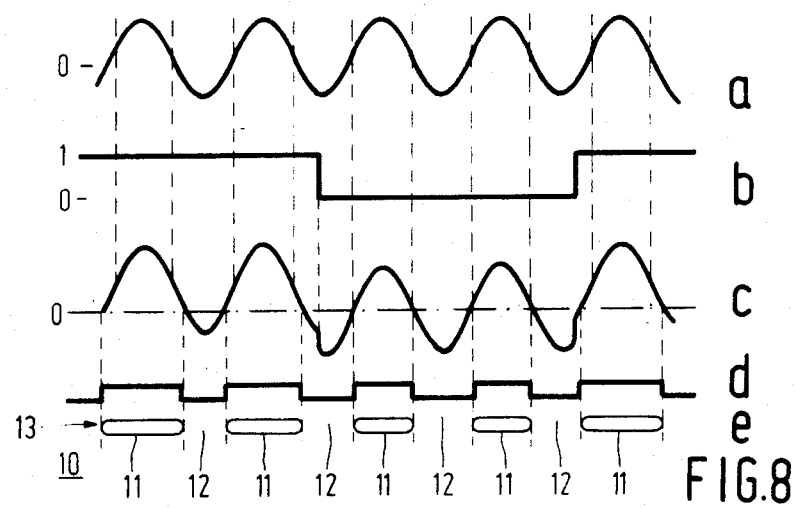
FIG. 8, consisting of a–e, shows some waveforms to illustrate the operation of the pulse-width modulator used in the apparatus shown in FIG. 6.

In FIG. 8, a shows a signal, in the present example a sinewave signal, representing the FM-modulated composite video signal; b shows a digital signal of a frequency lower than the frequency of the video signal a and also having a lower amplitude; and c shows the sum of these two signals. If after suitable amplification this signal is limited, a signal as shown in d is obtained. This signal d is a square-wave with a repetition rate corresponding to the instantaneous frequency of the FM-modulated video signal and a relative pulse-width corresponding to the digital signal. If this signal d controls a laser which inscribes an optically readable disc 10, a pattern as shown in e is obtained with a track 13 of optically detectable areas 11 of a length corresponding to the pulses in the signal d and with intermediate areas 12.

In order to compensate for the second-order lower side-band $J_2$, a compensation circuit 10 may be added to the pulse-width modulator, for example as described in U.S. Pat. No. 4,223,282.

Figure 7:
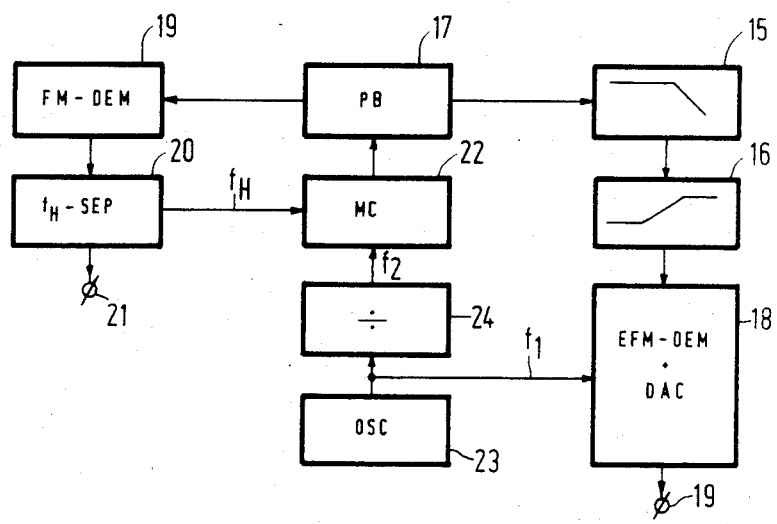
FIG. 7 shows an embodiment of an apparatus for reproducing a recording signal encoded by the apparatus using the inventive method.

FIG. 7 shows an embodiment of an apparatus for decoding a signal encoded by means of the apparatus shown in FIG. 6. This apparatus comprises a player 17 which reads the record carrier. The output signal is applied to a low-pass filter 15 which functions as pulse-width demodulator. Indeed, the signal a shown in FIG. 8 can be filtered out of the signal d by means of a low-pass filter having a cut-off frequency situated between the frequency bands occupied by these signals. The digital audio signal thus obtained is passed through a high-frequency pre-emphasis filter 16 which is complementary to the low-frequency pre-emphasis filter 8 (FIG. 6) and subsequently it is converted into an analog signal by means of a circuit 18 comprising an EFM-demodulator and a digital-to-analog converter, the signal processing being synchronized by a reference frequency $f_1$. The circuit 18 may be as described in the aforementioned issue of "Philips Technical Review" and may be eqeupped with IC's which are commercially available under type numbers SAAA 7000, SAA 7010, SAA 7020, SAA 7030, MAB 8410, TDA 1540 and Random Access Memory 6116.

The analog audio signal (in stereo version) is then available on output 19. The output signal of the player 17 is also applied to an FM-demodulator 19 whose output signal, via a sync separator circuit 20, becomes available on an output 21. The extracted synchronizing signal, the horizontal synchronization of the frequency $f_H$, is applied to a motor control circuit 22, which controls the speed of the player 17 in such a way that the frequency $f_H$ corresponds to a reference frequency $f_2$ within narrow limits.

The reference frequencies $f_1$ and $f_2$ may in principle be supplied by two separate generators. However, this is problematic because stringent requirements are imposed on the stability and mutual relationship of these two reference frequencies. One solution is to derive the two frequencies from one reference oscillator 23 by frequency division, if this is possible, so that phase-locked loops, which are not stable enough, are no longer necessary.

In the embodiment shown in FIG. 7, the oscillator 23 is tuned directly to the frequency $f_1$ and $f_2$ is obtained by dividing the frequency $f_1$, by means of a divider stage 24. For PAL the frequency $f_2$ must be 15.625 kHz, while $f_1$, when the said IC's are used, must be equal to 4.2336 MHz (96 times the sampling frequency of 44.1 kHz) within specific tolerances. It has been found that this is possible by tuning the oscillator to 4.2342375 MHz and dividing it by 271, so that precisely the correct value is found for $f_2$ and $f_1$ exhibits a deviation of $2 \times 10^{-4}$, which is acceptable.

Acceptable values for NTSC are obtained by means of an oscillator 23 which is tuned to 4.232518 MHz and by the use of a divider 24 which divides by 269. The deviation of the frequency $f_1$ is then $10^{-4}$.

However, the slight deviations of these frequencies, may lead to a time error in the decoding of the audio signal. Indeed, if the digital signal is decoded with a different frequency than the frequency with which it has been encoded, a time error arises which accumulates in reproduction. This may be compensated for by introducing a similar time error during encoding, for example by means of a sampling-frequency conversion.

What is claimed is:

1. A record carrier provided with an encoded recording signal, said encoded recording signal including a carrier wave signal frequency modulated by a composite color video signal, which modulated carrier wave signal is in turn pulse-width modulated by a digital signal, characterized in that said encoded recording signal comprises a track pattern of optically detectable areas which alternate with intermediate areas, which optically detectable areas have a mutual spacing in the track direction which is modulated in conformity with the instantaneous period of the frequency-modulated composite color video signal and a length relative to the adjacent intermediate areas which can assume substantially at least two distinct discrete values, the digital signal being encoded in the sequence of said distinct values.

2. An apparatus for encoding a recording signal, in a transmission system for recording and reproducing said recording signal on a record carrier, said recording signal including a composite color video signal and a digital signal, wherein said apparatus comprises:
   an FM-modulator for modulating said composite color video signal on a carrier wave signal of a frequency in the range of 6.5–8.5 MHz; and
   a pulse-width modulator for the pulse-width modulating of said frequency-modulated carrier wave signal by said digital signal, said digital signal including a bit stream of data bits each of which can assume a limited number of discrete values, the digital signal occupying a frequency band below the first-order lower side-band of the frequency-modulated carrier signal.

3. An apparatus as claimed in claim 2, characterized in that the pulse-width modulator is preceded by an EFM-modulator.

4. An apparatus as claimed in claim 3, characterized in that a low-pass filter with a cut-off frequency in the range from 1.5 to 2 MHz is arranged between the EFM-modulator and the pulse-width modulator.

5. An apparatus as claimed in claim 2, 3 or 4, characterized in that the pulse-width modulator is preceded by a low-frequency pre-emphasis filter in which signals of a frequency lower than a cut-off frequency are emphasized relative to signals of a frequency higher than said cut-off frequency.

6. An apparatus as claimed in claim 5, characterized in that the cut-off frequency of the low-frequency pre-emphasis filter is situated in the range from 100 kHz to 1 MHz.

7. An apparatus as claimed in claim 6, characterized in that said apparatus further comprises means for reducing the second-order lower side-band component of the modulated composite color video signal.

8. A method of encoding a recording signal in a transmission system for recording and reproducing said recording signal on a record carrier, said recording signal including a composite color video signal and a further signal, wherein said method comprises:
frequency modulating a carrier wave signal, having a frequency in the range of 6.5–8.5 MHz, with said composite color video signal;
locating said further signal in a frequency band below a first-order lower side-band of said frequency-modulated carrier wave signal said further signal being a digital signal having a bandwidth of at least 1.5 MHz and having a bit stream of data bits each of which can assume a limited number of discrete values; and
pulse-width modulating said frequency-modulated carrier wave signal with said digital signal.

9. A method as claimed in claim 8, characterized in that said record carrier comprises an optically readable disc-shaped record carrier.

10. A method as claimed in claim 9, characterized in that said bit stream of data bits in said digital signal comprises a series of digitally coded samples of an analog audio signal with a sampling frequency of 44.1 kHz, and said method further comprises EFM-modulating said digital signal prior to pulse-width modulating said frequency-modulated carrier wave signal therewith.

11. A method as claimed in claim 10, characterized in that said method further comprises low-pass filtering said EFM-modulated digital signal at a cut-off frequency in the range of 1.5–2.0 MHz prior to said pulse-width modulation.

12. A method as claimed in claim 8, 9, 10 or 11, characterized in that said method further comprises low-frequency pre-emphasis filtering said digital signal prior to said pulse width modulation, wherein signals of a frequency below a cut-off frequency are emphasized relative to signals of a frequency above said cut-off frequency.

13. A method as claimed in claim 12, characterized in that the cut-off frequency of the low-frequency pre-emphasis filter is situated in the range from 100 kHz to 1 MHz.

14. A method for reproducing a recording signal encoded in accordance with the method of claim 13, characterized in that said method for reproducing comprises generating a first reference frequency, related to said sampling frequency, for decoding said digital signal, and generating a second reference frequency, related to a horizontal synchronizing frequency in said composite color video signal, for processing said composite color video signal, said first and second reference frequencies both being derived from a third reference frequency.

15. A method as claimed in claim 14, characterized in that the composite color video signal is a PAL-color video signal, the third reference frequency is $n \times 4.234375$ MHz (where $n = 1, 2, 3, 4 \ldots$), and the second reference frequency is derived from said third reference frequency by dividing said third reference frequency by $n \times 271$.

16. A method as claimed in claim 14, characterized in that the composite color video signal is an NTSC-color video signal, the third reference frequency is $n \times 4.232518$ MHz (where $n = 1, 2, 3, 4 \ldots$) and the second reference frequency is derived from said third reference frequency by dividing said third reference frequency by $n \times 269$.

17. An apparatus for reproducing an encoded recording signal, comprising:
an FM-demodulator for recovering a composite color video signal, said composite color video signal modulating a carrier wave signal of said encoded recording signal, said modulated carrier wave signal being modulated by a digital signal; and
a pluse-width demodulator for recovering the digital signal.

18. An apparatus as claimed in claim 17 or 8 wherein said digital signal is low-frequency pre-emphasis filtered, further comprising:
a high-frequency pre-emphasis filter connected to the pulse-width demodulator;
wherein signals of a frequency above a cut-off frequency are emphasized relative to signals of a frequency below said cut-off frequency.

19. An apparatus as claimed in claim 18, characterized in that the cut-off frequency of the high-frequency pre-emphasis filter is situated in the range from 100 kHz to 1 MHz.

20. An apparatus as claimed in claim 19, characterized in that said apparatus comprises a first circuit for supplying a first reference frequency which is related to a sampling frequency of 44.1 kHz for decoding the digital signal produced by sampling an analog signal with a frequency of 44.1 kHz, a second circuit for supplying a second reference frequency which is related to the horizontal synchronizing frequency of said video signal, and a frequency generator which supplies a third reference frequency to which the first and second reference frequencies are locked.

21. An apparatus as claimed in claim 20, characterized in that the frequency generator is tuned to a frequency of $n \times 4.234375$ MHz ($n = 1, 2, 3, 4 \ldots$) and the second circuit produces the second reference frequency by dividing the third reference frequency by $n \times 271$.

22. An apparatus as claimed in claim 20, characterized in that the frequency-generator is tuned to a frequency of $n \times 4.232518$ MHz ($n = 1, 2, 3, 4 \ldots$) and the second circuit produces the second reference frequency by dividing the third reference frequency by $n \times 269$.

23. An apparatus as claimed in claim 17, further comprising:
an EFM-demodulator connected to the pulse-width demodulator.

24. In a transmission system having a recording signal containing a composite color video signal and a further signal, a method of encoding the recording signal, comprising the steps of:
frequency-modulating the color video signal on the frequency of a predetermined carrier;

digitally coding the further signal with a predetermined sampling frequency to a frequency band below the first order lower side-band of the frequency modulated carrier for substantially eliminating cross-talk between the digitally coded further signal and the video signal, the digitally coded signal having a bandwidth larger than that of the frequency modulated predetermined carrier; and pulse-width modulating the frequency modulated video signal with the digitally coded signal;

whereby the recording signal is encoded for storage on and reproduction from a recorded carrier.

25. The method according to claim 24, further comprising:

obtaining from the pulse-width modulated video and digitally coded signals a resulting signal for controlling a light means to inscribe optically readable codes on the record carrier.

26. The method according the claim 24, wherein the digitally coding step further comprises:

coding the further signal into a series of digital samples with a sampling frequency of 44.1 KHz.

27. Method according to claim 26, further comprising the steps of:

EFM-modulating the digitally coded further signal; and low-pass filtering the EFM-modulated digitally coded signal;

wherein the EFM-modulating and low-pass filtering steps are done prior to the pulse-width modulating step.

28. The method according the claim 27, further comprising the step of:

frequency pre-emphasis fitering the filtered EFM-modulated digital signal prior to the pulse-width modulating step.

29. In a transmission system having a recording signal containing a composite color video signal and a further signal coded on a record carrier, a method of decoding the recording signal comprising the steps of;

reading from the record carrier the recording signal;

transmitting the recording signal to a demodulation means;

generating from a reference frequency source a first reference frequency for pulse-width demodulating the further signal from digital to analog, the first reference frequency corresponding to a predetermined sampling frequency;

generating from the reference frequency source a second reference frequency for processing the composite color video signal to extract therefrom an output signal, the second reference frequency corresponding to a horizontal synchronizing frequency in the composite color video signal; and using the output signal as a feedback signal for controlling the speed of reading from the record carrier.

30. An apparatus for encoding a recording signal having a composite color video signal and a second signal comprising:

means for extracting the sync pulse from the composite color video signal;

means for processing the second signal, the processing means including means for converting the second signal from analog to digital, the processing means further including a modulating means;

means for receiving the sync pulse from the extracting means and for generating from the sync pulse a first frequency, the first frequency being transmitted to the modulating means for processing the digital second signal;

means connected to the receiving and generating means for pulse-width modulating the processed digital second signal with the composite color video signal, thereby generating an encoded FM signal;

whereby the encoded FM signal is recorded on a record carrier.

31. The apparatus according to claim 30, further comprising:

means interposed between the receiving and generating means and the pulse-width modulating means for filtering the pulse-width modulated and coded FM signal.

32. An apparatus for decoding a recording signal having a composite color video signal and a second signal, comprising:

means for generating first and second reference frequencies;

means for reading the recording signal from a record carrier;

means connected to the reading means for pulse-width demodulating the second signal, the pulse-width demodulating being done at the first frequency;

means connected to a reading means for frequency modulating the composite color video signal;

means connected to the frequency modulating means for separating the sync pulsefrom the composite color signal;

control means connected to the sync pulse separating means for receiving the sync pulse from the sync separating means, the sync pulse being used by the control means to control the speed of the reading means;

whereby the speed of the reading means corresponds substantially to the second frequency.

33. The apparatus according to claim 32, further comprising:

means interposed between the reading means and the pulse-width modulating means for filtering the second signal read from the reading means.

* * * * *